Figure 1:
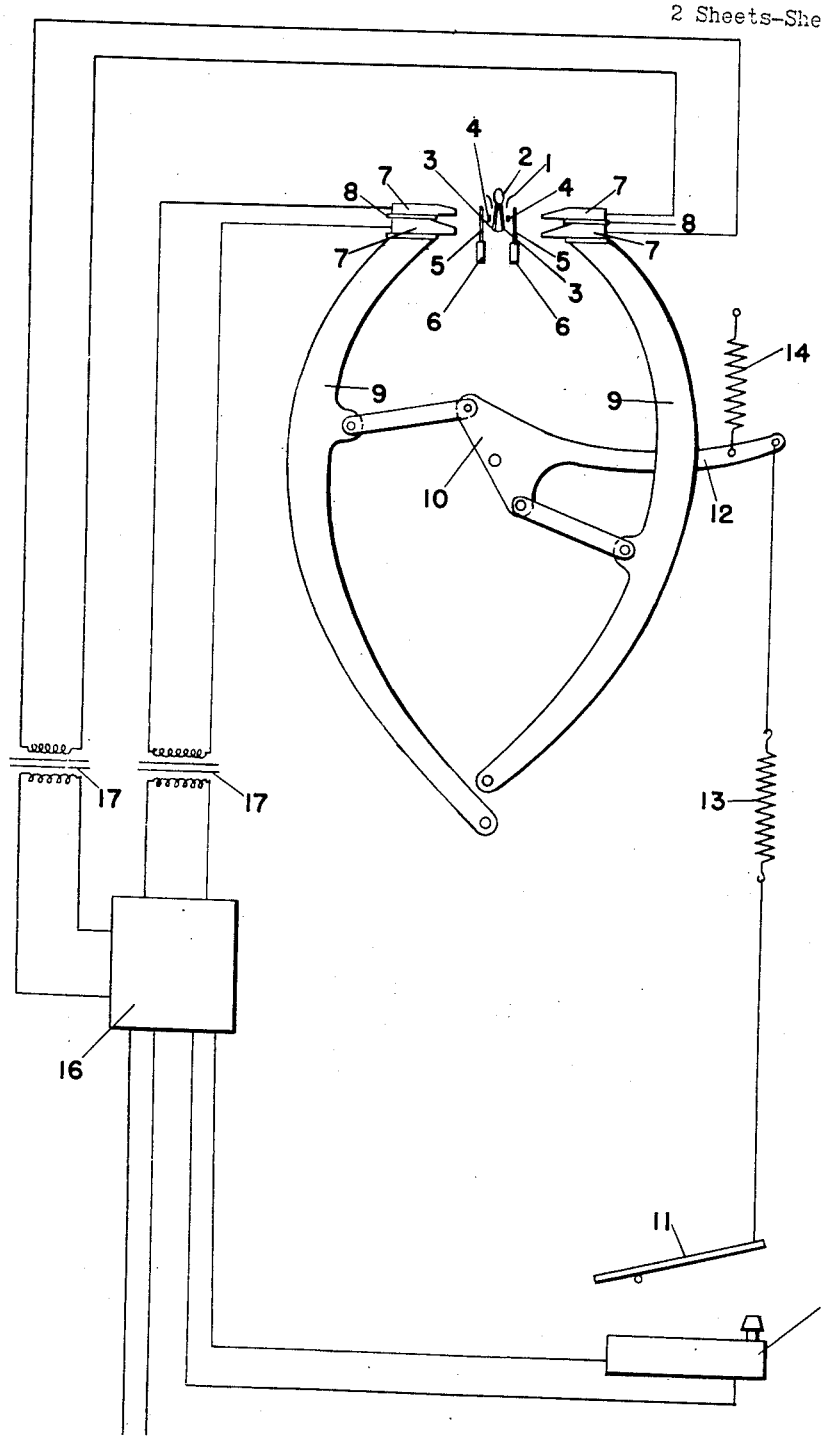

Sept. 11, 1956

K. J. BRIMLEY 2,762,903

PRODUCTION OF ELECTRIC FUSES

Filed Feb. 2, 1953

2 Sheets-Sheet 1

FIG. I.

INVENTOR.
KENNETH JOHN BRIMLEY
BY Cushman, Darby & Cushman
ATTORNEYS

Sept. 11, 1956  K. J. BRIMLEY  2,762,903
PRODUCTION OF ELECTRIC FUSES
Filed Feb. 2, 1953  2 Sheets-Sheet 2

INVENTOR.
KENNETH JOHN BRIMLEY

BY Cushman, Darby & Cushman
ATTORNEYS

2,762,903

PRODUCTION OF ELECTRIC FUSES

Kenneth John Brimley, Stevenston, Scotland, assignor to Imperial Chemical Industries Limited, a corporation of Great Britain Application February 2, 1953, Serial No. 334,585

Claims priority, application Great Britain March 21, 1952

3 Claims. (Cl. 219—85)

The present invention relates to improvements in or relating to the production of electric fuses of the kind comprising an electric fusehead of the kind having two metal foil pole pieces separated by a sheet of non-conducting material and an insulated leading wire soldered to each metal foil pole piece.

Such electric fuseheads are normally produced by soldering a high resistance bridge wire to two metal foil pole pieces separated from each other by a sheet of non-conducting material and thereafter covering the bridge wire with one or more coats of an ignitible composition followed, if desired, by a coat of a suitable varnish or lacquer, and leaving exposed portions of both pole pieces at the fusehead end remote from the bridge wire. The fusehead so produced is then normally soldered to the bared ends of two insulated wires in conventional manner by means of a tinned soldering bolt. This method of soldering, however, suffers from various disadvantages. Thus, for example, the soldering bolt has a high heat capacity and tends to cause overheating of the insulated wires and consequently destruction or softening of the insulated material which may subsequently result in the short circuiting of the fusehead. There is also a tendency using this method for short circuits to be caused either by an excessive quantity of solder flowing on to the joint or by a bridge of solder over the gap between the pole pieces. These are grave disadvantages, particularly when the electric fuses so produced are used as the igniting charge for electric detonators which are liable to be used for firing a large number of explosive charges in series. If one of the detonators has a short circuit the faulty detonator allows the rest of the series to fire but does not itself fire thus leaving one or more unfired shots after firing of the bulk of the charge with consequent danger of subsequent firing at an inopportune moment.

Furthermore soldering with a bolt tends to loosen the adhesion between the metal foil pole piece and the non-conducting material.

It has now been found that these disadvantages can be overcome by soldering the wires to the fusehead electrically in such manner that only the bare end of each wire is heated.

According to the present invention the method for producing electric fuses wherein an electric fusehead of the kind having two metal foil pole pieces separated by a sheet of non-conducting material has an insulated bare end leading wire soldered to each metal pole piece comprises effecting the soldering between the bare end of the insulated leading wire and the metal foil pole piece by using a pair of electrodes to apply a current to generate heat in the bare end of each leading wire and to press said bare end and an intervening portion of solder against a metal foil pole piece.

More specifically the method for producing electric fuses as aforesaid comprises positioning an electric fusehead of the aforesaid kind so that each of its two metal foil pole pieces faces a strip of solder which is preferably flux cored and which is delivered from a supply thereof and positioning a bare end of an insulated leading wire on the other side of each of the strips of solder, pressing a pair of electrodes against each of said bare ends so that one bare end contacts a portion of the outer side of one strip of solder and the inner side of substantially the same portion of this strip of solder contacts a metal foil pole piece, and passing an electric current of such strength and duration through each pair of electrodes and the bare end of an insulated leading wire against which each pair is pressed so as to solder a bare wire to each metal foil pole piece.

Preferably said strips of solder travel intermittently at right angles to the positioned electric fusehead. Furthermore it is preferred that the strip of solder which is between the metal foil pole piece and the bare end of the insulated leading wire should be equi-distant from the tip of each electrode applied to the bare end of the insulated leading wire.

It is particularly desirable that the electrodes should have high thermal and electrical conductivity.

The method of the present invention may be operated entirely manually, part manually and part automatically, or completely automatically. Thus in accordance with one embodiment a fusehead may be positioned in a jig, two solder feeds advanced the required distance, two bared ends of insulated leading wires placed in jigs manually, the two sets of electrodes then moved mechanically and in their movement push the bared ends into operating position, and an electric current then passed through the bared ends. The passing of the current may be achieved automatically after the electrodes and the bared ends of the wires reach the operating position and the assembly is under pressure or separate means may be provided to close the circuit. On the other hand the whole process may be mechanised so that an electric fusehead is automatically fed to the jig and the remaining operations carried out in sequence by automatic means. The installation used may also, if desired, be provided with means for ejecting the finished electric fuse.

The strength and duration of the electric current applied should be adequate to give a good soldered joint. The power required will, of course, vary with the gauge of wire used, the nature of the wire and the distance between the electrodes. Thus, for example, a current of 200 amperes applied for $\frac{1}{4}$ of a second gives very satisfactory results when applied to 23 gauge copper wire by means of tungsten tipped electrodes which are $\frac{5}{32}''$ apart.

The electrodes may be made of any hard metal which does not become tinned on contact with flux and molten solder under the operating conditions and which will not adhere to the solder. Tungsten tipped brass has been found to be extremely suitable for this application.

An additional advantage of the present invention is that a stronger joint is obtained between the wires and the pole pieces than by the prior methods of soldering. Furthermore, electric fuses soldered by the formely available methods in some cases tend to come apart at the soldered joint, particularly if the wires are not aligned axially with the fusehead, when crimped into the detonator tubes, because of the longitudinal stress applied in crimping. The electric fuses of the invention in which the wires are accurately positioned before soldering do not suffer from this tendency.

Apparatus according to the invention comprises a fusehead holder and means adapted to operate two mechanical linkages each carrying a pair of electrodes and each adapted to guide its pair of electrodes towards a metal foil pole pieces of a fusehead positioned in said fusehead holder so as to press an intervening end portion of solder and a bare wire of an insulated leading wire on to said pole piece, then to operate a switch mechanism for actuating a time switch so as to pass a current from a supply of electricity for a predetermined period of time through each primary of a pair of electrical transformers, each secondary of which is electrically connected through an independent circuit to one of said pairs of electrodes, and thereafter to operate said mechanical linkages so that the electrodes are withdrawn.

Preferably said electrodes are of high thermal and electrical conductivity.

If desired means can be provided for delivering a fusehead of the aforesaid kind into the fusehead holder and furthermore, if desired, there can be provided mechanism for feeding in synchronised association two strips of solder discontinuously from supplies thereof so that a fresh end portion is in front of each metal foil pole piece of a positioned fusehead. Furthermore, if desired, means can be provided for delivering a bared end of an insulated leading wire so that a bared end portion of solder strip substantially bisects the length of bared leading wire which is to be electrically heated. Preferably likewise this means is in synchronised association with said means for delivering a fusehead and said mechanism for feeding two strips of solder discontinuously.

Figure 2:
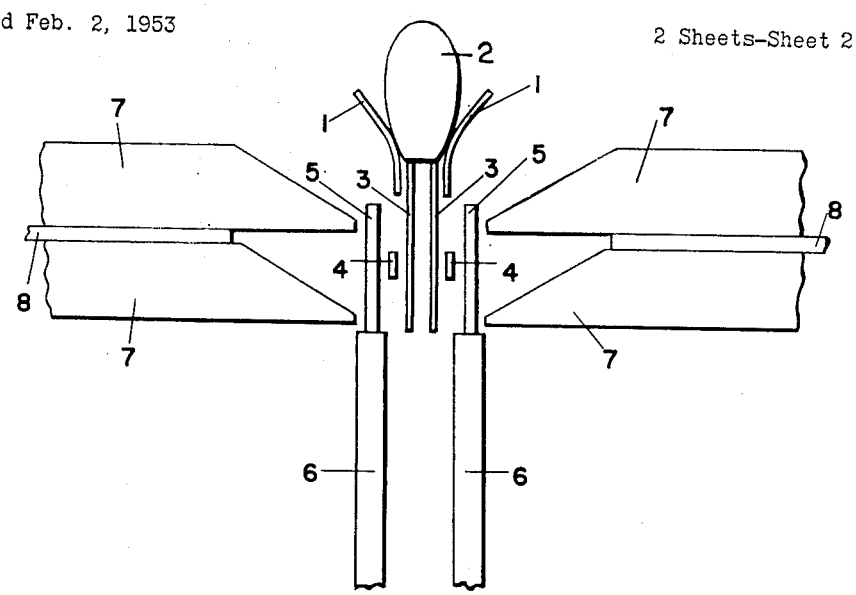
Figure 3:
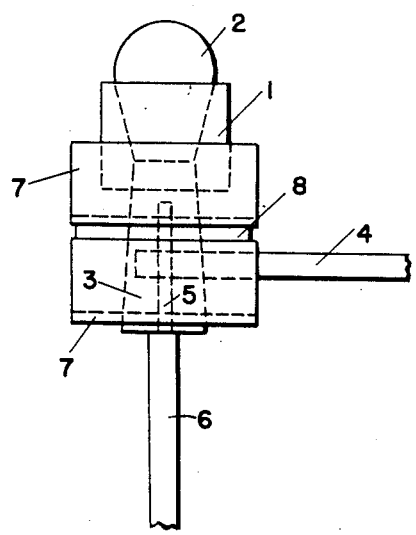

An embodiment of apparatus according to the invention showing a fusehead in position as well as end portions of two strips of solder and two bared insulated wires is illustrated with reference to the accompanying diagrammatic drawings in which Figure 1 is the front view, Figure 2 is an enlargement of Figure 1 in the neighbourhood of two pairs of electrodes and Figure 3 is a side view enlargement of Figure 1 in the neighbourhood of the two pairs of electrodes.

In the drawings the fusehead holder 1 retains in position the electric fusehead 2 having exposed portions of metal foil pole pieces 3. In front of each metal foil pole piece 3 there is a fresh end portion of flux cored solder 4 discontinuously fed from a supply thereof by a mechanism not shown. A bare end 5 of an insulated leading wire 6 is shown on the outside of each fresh end portion of flux covered solder 4. 7 are two pairs of high thermally and electrically conductive electrodes wherein the electrodes of each pair are separated by paper insulation 8. Each pair of electrodes 7 is fixed to an arm 9 of a link mechanism 10 for bringing together and separating the two pairs of electrodes 7. 11 is a pedal which on being pressed down acts on the operating arm 12 through the spring 13 so as to bring the two pairs of electrodes 7 into such a position that they are able to press the positioned fusehead 2, bare end wires 5 and the end portions of flux cored solder 4 close together. At the same time a spring 14 for subsequently separating the arms 9 is extended. On further depressing the pedal 11 the spring 13 is extended to cause the electrodes 7 to apply adequate pressure to the bared wires 5 so as to give good electrical contact between each bared wire 5 of an insulated leading wire 6 and its associated pair of electrodes 7. This pressure is produced by a predetermined elongation of spring 13 at which elongation the switch 15 is operated causing the time switch 16 to be brought into action. Each set of electrodes 7 is connected by separate flexible leads to the secondary circuit of an electrical transformer 17. The primary circuit of each electrical transformer 17 is connected separately to the mains by way of the time switch 16. The electrical transformers 17 convert the high voltage alternating current from the mains supply into a current of adequate magnitude as for instance 200 amperes for copper leading wires of 23 gauge S. W. G. with a separation of ⅛ inch between the tips of a pair of electrodes. The time switch 16 is arranged to pass a current through the two sets of electrodes 7 and the bared ends 5 of the insulated leading wires 6 for the short time necessary to effect the soldering operation. A third of a second is usually found to be sufficient. Immediately the soldering has been effected and the current has ceased the electrodes 7 cause the joint to cool quickly. On releasing the pressure on the pedal 11, the micro-switch operating spring 13 and the spring 14 contract and the contraction of spring 14 brings about the separation of the electrodes 7.

What I claim is:

1. A method for producing electric fuses wherein an electric fusehead of the kind having two metal foil pole pieces separated by a sheet of non-conducting material has an insulated bare end leading wire soldered to each metal pole piece which comprises providing a portion of solder between each metal foil piece and an associated bare end of insulating leading wire, pressing each bare end, associated solder portion and associated metal foil pole piece together by a pair of electrodes pressed against each bare end, and passing an electrical current through each pair of electrodes and the bare end pressed thereagainst so as to generate heat therein sufficient to solder each bare end to its associated metal foil pole piece without excessively heating the latter.

2. Apparatus for soldering the bare ends of insulating lead wires to metal foil pole pieces of a fuse-head comprising a fusehead holder, opposed pairs of electrodes disposed adjacent said fuseholder, means for mounting said electrodes for movement toward and away from the metal foil pole pieces of a fusehead carried by said fuseholder, said electrodes when moved toward said metal foil pole pieces being adapted to press the bare ends of insulated lead wires and intervening portions of solder disposed in the path of movement of said electrodes against said metal foil pole pieces, means for moving said electrodes, a source of electrical current, means for connecting said source to said electrodes, said connecting means including a time switch adapted to connect said source to said electrodes for a predetermined time, and means for actuating said time switch.

3. A method as claimed in claim 1 wherein the portion of solder which is between the metal foil pole piece and the bare end of the insulated leading wire is equi-distant from the tip of each electrode applied to the bare end of the insulated leading wire.

References Cited in the file of this patent

UNITED STATES PATENTS

| 1,635,510 | Tevander | July 12, 1927 |
| 1,660,805 | Moineau | Feb. 28, 1928 |
| 2,385,118 | Ward | Sept. 18, 1945 |
| 2,494,474 | Fermanian et al. | Jan. 10, 1950 |
| 2,602,872 | Ziegler | July 8, 1952 |

FOREIGN PATENTS

| 546,695 | Great Britain | July 27, 1942 |